United States Patent [19]

Hamaguchi et al.

[11] Patent Number: 5,323,098

[45] Date of Patent: Jun. 21, 1994

[54] POWER-CHARGING SYSTEM FOR TRANSPORTER CART

[75] Inventors: Hideo Hamaguchi, Komaki; Hideichi Tanizawa, Moriguchi; Shigeyoshi Nishihara, Nishinomiya, all of Japan

[73] Assignee: Daifuku Co., Ltd., Osaka, Japan

[21] Appl. No.: 745,522

[22] Filed: Aug. 15, 1991

[30] Foreign Application Priority Data

Sep. 13, 1990 [JP] Japan ................................. 2-245162
Nov. 20, 1990 [JP] Japan ................................. 2-317150

[51] Int. Cl.⁵ ..................... H01M 10/46; B60L 9/00; B61L 3/00
[52] U.S. Cl. ............................................ 320/2; 191/4; 246/187 R
[58] Field of Search ..................... 320/2; 191/2, 4, 10, 191/23 R, 29 R, 30; 246/187 R

[56] References Cited

U.S. PATENT DOCUMENTS

| Re. 29,994 | 5/1979 | Bossi | 191/2 |
|---|---|---|---|
| 3,637,956 | 1/1972 | Blackman | 191/4 |
| 3,914,562 | 10/1975 | Bolger | 191/10 |
| 3,986,095 | 10/1976 | Nakai | 320/2 |
| 4,176,609 | 12/1979 | Allen | 191/2 |
| 4,679,152 | 7/1987 | Perdue | 364/513 |
| 4,800,328 | 1/1989 | Bolger et al. | 320/2 |

FOREIGN PATENT DOCUMENTS

| 61-218303 | 9/1986 | Japan . |
| 63-11002 | 1/1988 | Japan . |
| 63-242105 | 10/1988 | Japan . |
| 2072562 | 10/1981 | United Kingdom . |

Primary Examiner—Steven L. Stephan
Assistant Examiner—Adolf Berhane
Attorney, Agent, or Firm—Webb Ziesenheim Bruening Logsdon Orkin & Hanson

[57] ABSTRACT

A power-charging system for a transporter cart is disclosed. The system includes a power-supplying electrode disposed along and at a predetermined section of a travelling passage along which the transporter cart automatically runs by power from a battery mounted thereon and a power-receiving electrode attached to the transporter cart and a slide-contactable with the power-supplying electrode during the automatic run of the cart.

12 Claims, 8 Drawing Sheets

POWER-CHARGING SYSTEM FOR TRANSPORTER CART

BACKGROUND OF THE INVENTION

1. Field of the Invention

The present invention relates to a power-charging system for a transporter cart, and more particularly to a power-charging system of this type for charging an electric-powered transporter cart which mounts a battery for automatically propelling the transporter cart along a predetermined travelling route.

2. Description of the Related Art

In this type of power-charging system, a power-charging operation to the transporter cart is generally done at a power-charging station specially provided for the system, since the power-charge requires a long period of time. According to another conventional method, an exhausted battery is dismounted from the transporter cart for replacement with a newly charged battery.

In the former case, the transporter cart remains out of service for e.g. transporting job while the cart stays at the power-charging station. In the latter case, the replacement of the batteries is time-consuming and troublesome. In either case, the entire transport system suffers inefficiency.

For improvement of the system efficiency, it is essential to maximize the interval between power-charging operations by minimizing power consumption of the battery. Conventionally, this is done by specially designing the transporter cart for improvement of power consumption economy or by effecting an auxiliary power-charging operation to the transporter cart in the middle of its transporting job.

The power-charging operation at the station is generally done while the transporter cart is stopped for mounting or dismounting load to or from the cart. In other words, the time period available for power-charging operation is limited by the time period required of the load mounting/dismounting work. Thus, the system suffers significant inefficiency if the cart is stopped at the station only for power charge after the job is done.

The present invention attends to these inconveniences of the convention. The primary object of the present invention is to provide an improved power-charging system for a transporter cart, which system can efficiently charge the cart without sacrificing efficiency of the entire transport system while minimizing power consumption of this transporter cart.

SUMMARY OF THE INVENTION

For accomplishing the above-noted object, a power-charging system for a transporter cart, according to the present invention, comprises:

a power-supplying electrode disposed along and at a predetermined section of a travelling passage along which the transporter cart automatically runs by power from a battery mounted thereon; and a power-receiving electrode attached to the transporter cart and slide-contactable with said power-supplying electrode during the automatic run of the cart. Functions and effects of this construction will be described next.

According to the invention's construction, the power-charging operation is effected on the cart while the transporter cart is travelling or stopped at the predetermined section through the sliding contact between the power-supplying electrode and the power-receiving electrode. And, the predetermined section may include a work station and/or a straight passage where the transporter cart travels at a relatively low speed. Accordingly, the power-charging operation can be stably done for an extended period of time.

Then, since the power-charging operation is effected while the transporter cart is running or stopped, i.e. during the cart operation including its run between stations, the invention's system can efficiently power-charge the transporter cart without sacrificing efficiency of the entire transport system while minimizing power consumption of this transporter cart, so that the interval between full power-charging operations can be extended.

According to one preferred embodiment of the present invention, the travelling passage comprises a transporter cart guideline and the transporter cart includes a sensor for sensing this guide line, so that the cart effects an automatic run along the guide line based on the detection of the sensor.

With these features, the cart run at the predetermined section is guided by the guide line; and therefore, if the power-supplying electrode is disposed along this guide line, the sliding contact between the electrodes can be stably maintained without having to provide any special means for causing the power-receiving electrode to follow the power-supplying electrode.

Accordingly, with the above feature, the mechanism for establishing the contact between the power-receiving electrode and the power-supplying electrode can be constructed simple, so that the system can achieve the above-described distinguished effects with minimizing cost increase.

Preferably, the power-supplying electrode is embedded in the travelling track; while, the power-receiving electrode is constructed freely projectable from and retractable to a bottom portion of the transporter cart.

In this case, except for the predetermined section, the cart maintains the power-receiving electrode retracted into the cart body or to the bottom face thereof; and at the predetermined section alone the power-receiving electrode is projected downwardly therefrom for the contact with the power-supplying electrode disposed along the passage.

According to the above feature, since the power-supplying electrode is embedded in the travelling track, this arrangement can effectively avoid the inconveniences such as short-circuit or electricty leakage due to adhesion of conductive foreign substance to the electrode, insufficient contact due to adhesion of dust, soil, oil or the like which tends to occur in case the electrode is exposed to the ambience on the travelling passage. Further, since the power-receiving electrode on the cart is retracted away from the travelling passage, this can effectively prevent this electrode from being damaged in case the transporter cart runs over or hits an object erroneously placed on the travelling passage and prevent also a travelling accident due to the interference between the power-receiving electrode and the object, so that the system can achieve improvement of safety as well.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a power-charging system for a transporter cart relating to the present invention; in which.

DESCRIPTION OF THE PREFERRED EMBODIMENTS

Preferred embodiments of a power-charging system for a transporter cart, relating to the present invention, will now be described in details with reference to the accompanying drawings.

Figure 1:
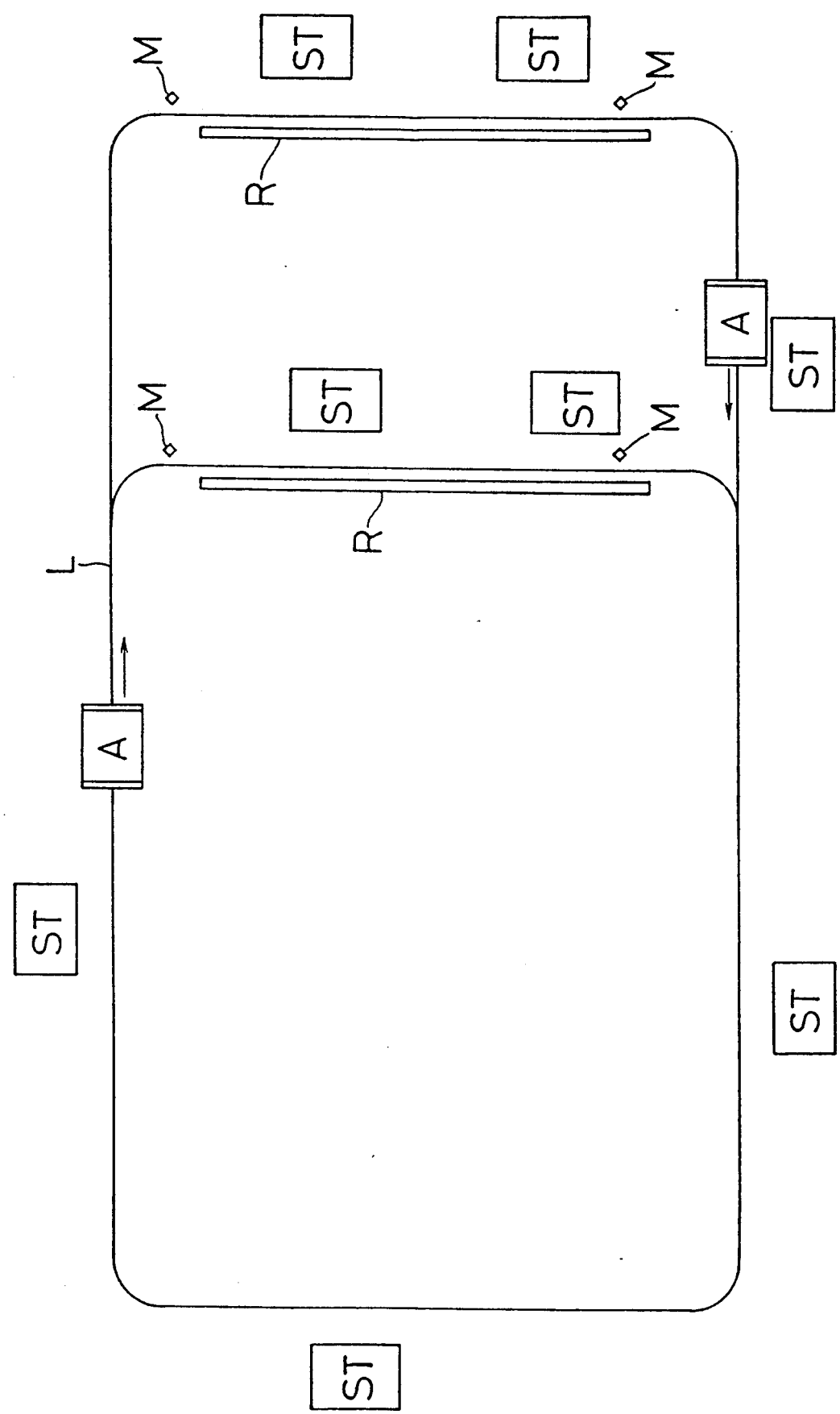
FIG. 1 is a plane view showing a schematic layout of an entire transporting system.

As shown in FIG. 1, a transporter cart guide line L is disposed in the form of a loop along a travelling passage of a transporter cart A for transporting load. A plurality of stations ST for mounting and dismounting the load to and from the transporter cart A are disposed along this guide line L. According to this load-transporting system, the load is transported to and from the stations ST by the cart which automatically runs between the stations ST.

The guide line L has a rectangular cross section and comprises a magnetic member having the N pole in its front side and the S pole in its back side. The magnetic member is fixedly covered with epoxy resin so as to form a surface flush with the travelling passage.

At predetermined sections of the travelling passage, there is provided along the guide line L a power-supplying rail R as an example of a power-supplying electrode for power-charging the transporter cart A. Further, marks M are provided adjacent opposed ends of the predetermined sections, so that the transporter cart A can detect the starting and terminal ends of the predetermined sections. This mark M is a magnetic element embedded along the travelling passage and having the S pole at its front side and the N pole at its back side. The polarity arrangement of this mark M may be reversed, depending on the convenience.

Figure 2:
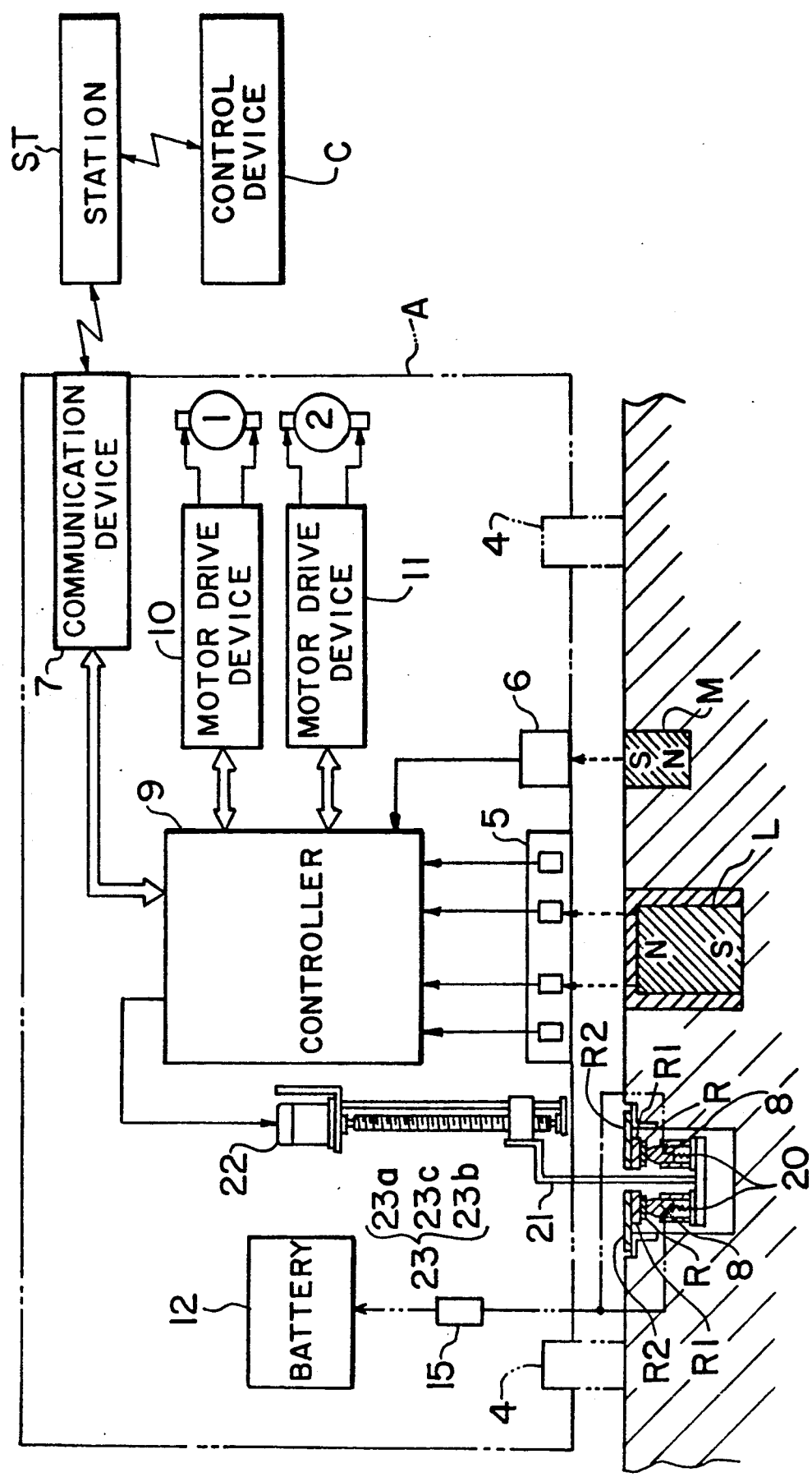
FIG. 2 is a block diagram in section showing major portions of the system as viewed in the direction of transporter cart run.
Figure 3:
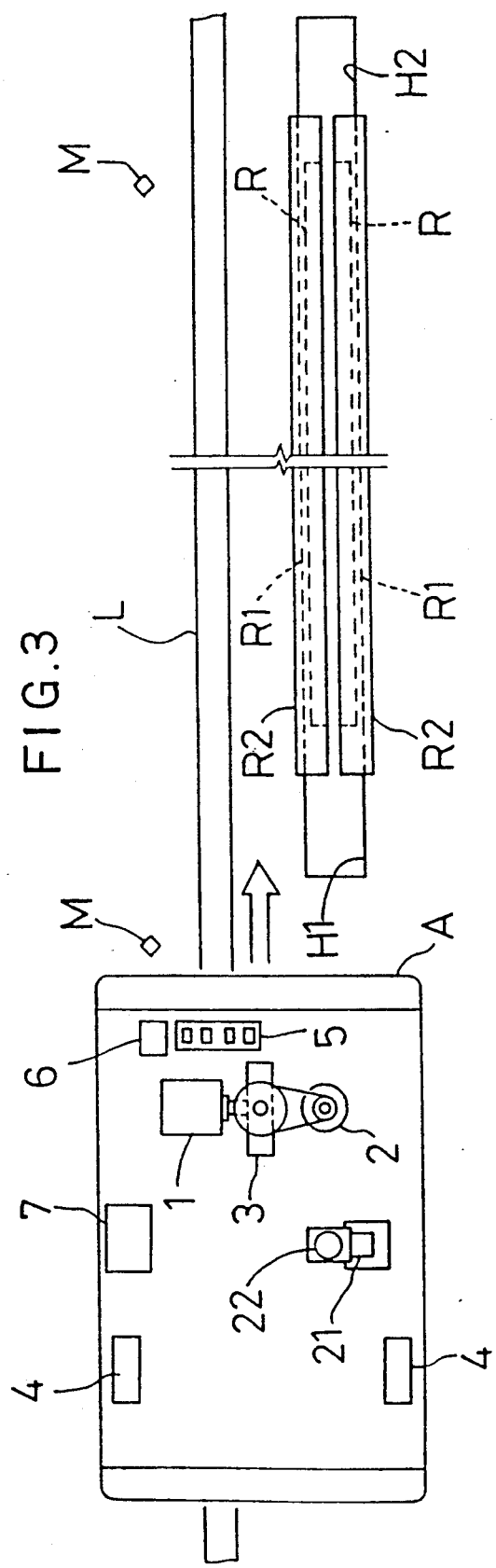
FIG. 3 is a schematic plane view illustrating a relationship between a construction of the transporter cart and a travelling passage.

Major portions of the construction of the transporter cart A are shown in the block diagram of FIG. 2 and in the plane view of FIG. 3. As shown, the transporter cart includes, at a forward position thereof, a driving/steering wheel 3 driven for transporter cart drive by a propelling motor 1 through a propelling motor drive device 10 and steered by a steering motor 2. The transporter cart includes, at rear positions thereof, a pair of right and left driven wheels 4. Further, forwardly of the drive wheel 3, a magnetic sensor 5 is provided for sensing the guide line and obtaining steering control data therefrom, the sensor 5 being steerable with the driving/steering wheel 3.

The magnetic sensor 5, as shown in FIGS. 2 and 3, consists of a plurality (four in this particular construction) of magnetism-sensing elements arranged along the transverse direction of the cart body. These elements are disposed with a predetermined distance therebetween. So that, when a widthwise center of this magnetic sensor 5 is aligned properly relative to the guide line L, i.e. when the widthwise center is positioned at the center of this guide line L, the inner pair of the four magnetism-sensing elements sense the magnetism of the guide line L while the outer pair elements do not. On the other hand, when the transporter cart A is sidewise displaced relative to the guide line L, the outer two elements come to sense the magnetism of the guide line L.

A detection signal of the magnetic sensor 5 is inputted to a control apparatus 9 incorporating a microcomputer. Then, based on this signal, the control apparatus 9 executes a steering control operation for steering the displaced transporter cart A back to its proper position relative to the guide line L by energizing the steering motor 2.

At a left side of the magnetic sensor 5, there is provided a mark sensor 6 for detecting the marks M disposed in the travelling surface. This mark sensor 6 too is a kind of a magnetism sensor which senses the mark M formed of the magnetic element when coming close thereto.

At a longitudinally central and left position of the transporter cart, there is provided a communication device 7 having a light emitting element and a light receiving element. On the other hand, a corresponding communication device having a light emitting element and a light receiving element is provided at a position of each station ST where the transporter cart A is stopped at this station ST. Accordingly, communication is effected between the station ST and the transporter cart A. Or, via this station ST, communication is effected between the transporter cart A and a central control device C which controls the entire system operations. For instance, when the transporter cart A communicates to the station ST completion of job at this station, the station ST provides the cart A with address data of a next target station where the transporter cart A is to travel for a next job.

The transporter cart A mounts a battery 12 as the power source for effecting the job at the station ST and the communications. When this battery becomes low in capacity because of discharging, the battery 12 is dismounted from the cart A for replacement with a newly charged battery. The dismounted battery 12 is charged by a battery charger.

For improvement of the system efficiency, it is essential to maximize the interval between power-charging operations by minimizing power consumption of the battery 12 mounted on the transporter cart A. That is, it is necessary to decrease the frequency of the battery replacement operation.

Then, in addition to specially designing the transporter cart A for improvement of power consumption economy, according to the system of the invention, the power-charging operation to the battery is effected from the travelling passage while the cart is travelling or stopped at the predetermined sections provided in the travelling passage, so as to save power consumption of the battery 12 and to effect the floating power-charging operation. To this end, as shown in FIG. 1, the power-supplying rail R is provided at each predetermined section including the station ST. While, the transporter cart A, as shown in FIG. 2, mounts a collector member 8 as an example of a power-receiving electrode which slide-contacts the power-supplying rail R.

Figure 4:
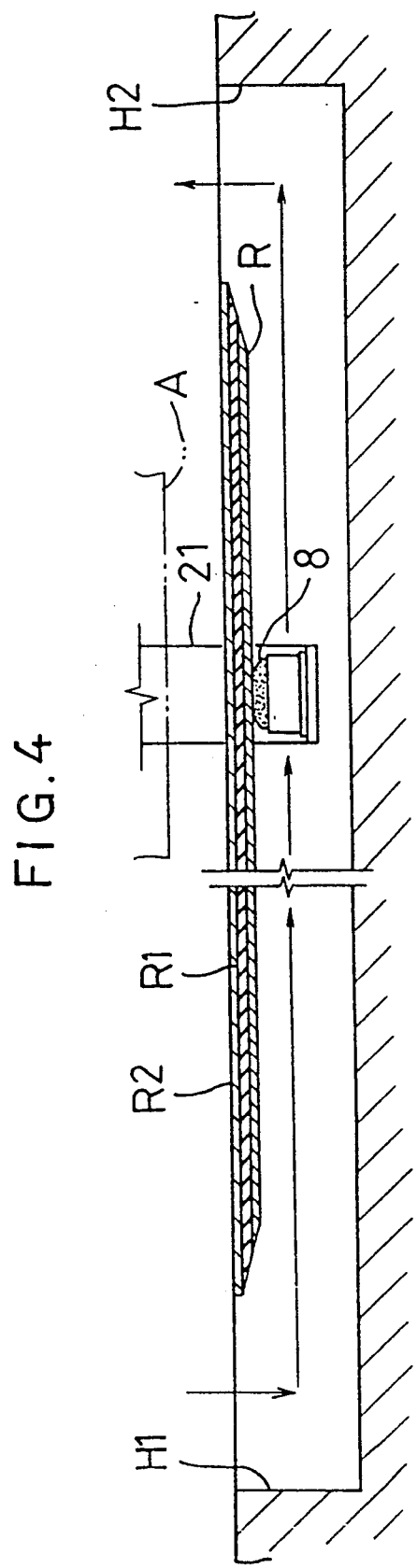
FIG. 4 is a side view in section showing a disposing construction of a power-supplying electrode.

This power-supplying rail R, as shown in FIGS. 2 through 4, comprises a parallel pair of conductive members embedded in the travelling passage on which a direct current voltage is impressed. In consideration to the reliability of the conductive surface and the safety, the power-supplying rail R has its conductive surface covered with an insulator R1 and a pit cover R2 so that the rail is disposed flush with the travelling passage surface without the rail being exposed therefrom. Accordingly, the sliding contact is established between a lower side face of the powers-supplying rail R and the collector member 8 of the transporter cart A.

The collector member 8 of the cart A, as shown in FIG. 2, is attached to a frame 21, with the member 8 being elastically urged to the frame by means of a coil spring 20.

The frame 21 is attached to the cart A so that this frame 21 is vertically moved relative thereto by means of a motor 22 and a screw-feed mechanism 23. More particularly, this screw-feed mechanism 23 includes a male screw 23a fixed to a rotary shaft of the motor 22 and a guide 23c screw-engaged with the male screw 23a for vertically sliding the frame 21. Then, when the motor 22 is driven forwardly or reversely by the control apparatus 9, the frame 21 is moved upwards or downwards, thus retacting or projecting the collector member 8 to and from the bottom portion of the transporter cart A.

As described hereinbefore, the marks M are provided at the starting and terminal ends of the predetermined sections where the power-supplying rails R are embedded. Then, as the transporter cart A approaches the predetermined section, the control apparatus 9 of the transporter cart detects this mark M through the mark sensor 6, upon which detection the apparatus 9 drives the motor 22 for moving the collector member 8 downwardly from the bottom portion of the transporter cart A. The collector member 8 moves downward through a hole H1 defined at a position before the starting end of the embedded power-supplying rail and makes a stop at a predetermined position. Thus, as the transporter cart A travels along the guide line L, the collector member 8 maintains its upper contact face in a sliding contact with the lower face of the power-supplying rail R.

At the terminal end of the predetermined section, upon detection of the further mark M provided before the terminal end of the power-supplying rail R, the control apparatus 9 drives the motor 22 for conversely lifting up the collector member 8 to store this at the bottom portion of the cart A, so that the collector member 8 is lifted up through a hole H2 defined in the travelling surface after the terminal end of the power-supplying rail R.

The predetermined section includes the station ST and is provided at a passage portion where the cart A travels straight at a low speed. So that, while the cart A stays at the station ST, the contact between the collector member 8 and the power-supplying rail R is maintained for continuing the power-charging operation.

Figure 5:
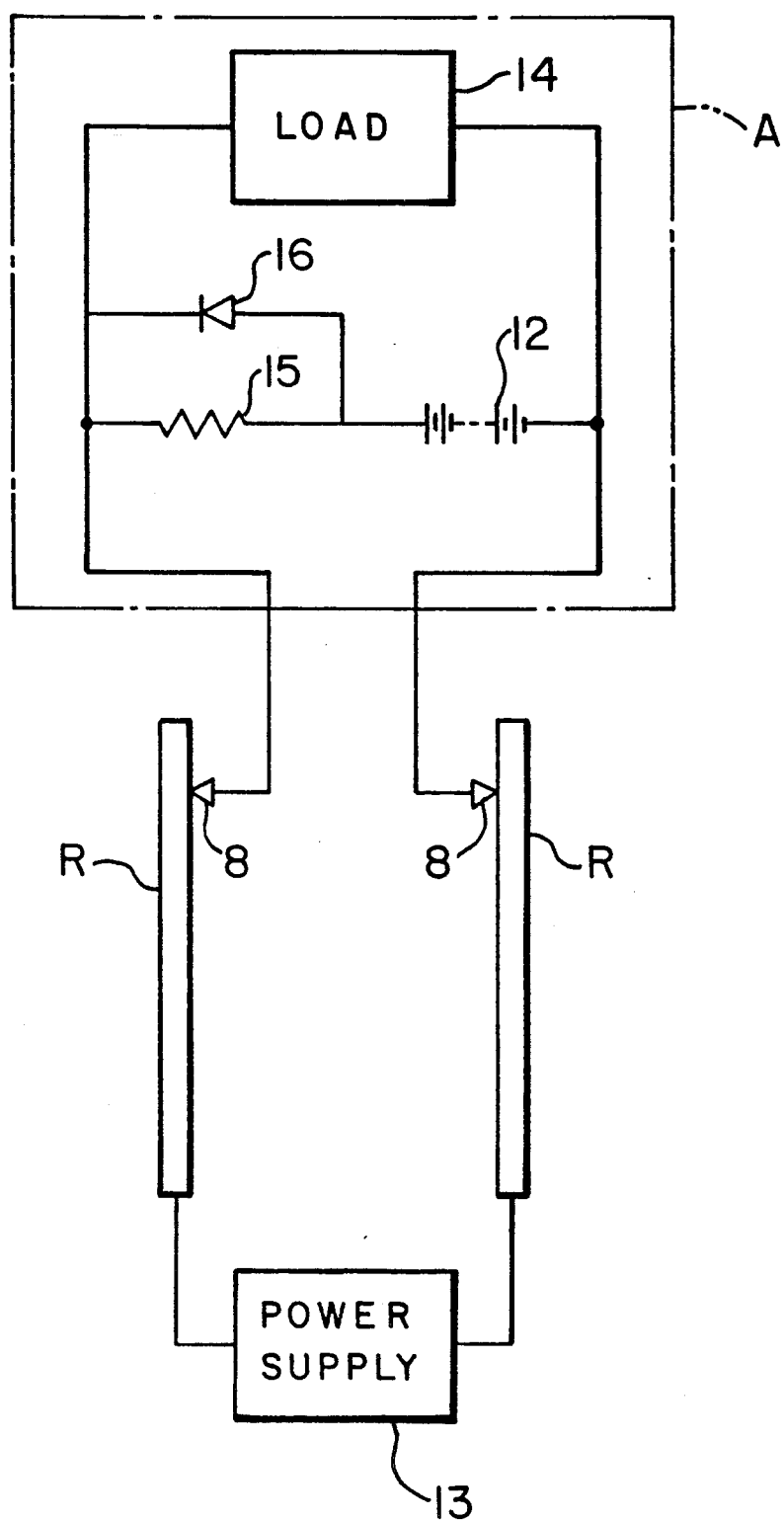
FIG. 5 is a circuit diagram of a circuit for a floating power-charge.

The power-supplying rail R, as shown in FIG. 5, is impressed with a direct current voltage from a power supplying apparatus 13. This direct current voltage is set slightly higher than a rated voltage of the battery 12. Then, the direct current voltage received by the collector member 8 of the transporter cart A is impressed to a load 14 including the propelling motor 1, the steering motor 2, the control apparatus 9 and so on and also is connected with the battery 12 through a current-limiting resistance 15, whereby the floating power-charging operation is effected. A reference numeral 16 denotes a rectifier element for the charging from the battery 12 to the load 14.

As described above, according to this system, the power for propelling the transporter cart A at the predetermined section and for the work at the station ST is supplied from the on-the-ground system portion, so that the power consumption of the cart battery 12 can be saved and also that through the auxiliary power-charging operation by the float charging operation the interval between full power-charging operations can be extended.

For charging the battery 12, it is not always necessary to dismount this battery 12 from the transporter cart A as described in the foregoing embodiment. Alternately, it is conceivable to guide the cart A mounting the battery 12 to a location out of the travelling passage for the transport work, so that the power-charging operation is effected on this battery 12 at this station. In this case too, the power-charging system of the present invention can be utilized. In this construction, the collector member 8 is again used as the power-receiving electrode mounted on the cart A and the power-supplying rail will be installed at the power-charging location as the power-supplying electrode for the contact with the collector electrode 8.

A further embodiment of a power-charging system for a work transporter cart will be described next.

In this further system, the power-supplying electrode R to be impressed with an alternate current voltage is provided at a predetermined position of the cart travelling passage. On the other hand, the transporter cart A mounts the power-receiving electrode 8 for the contact with the power-supplying electrode R and a battery charger for stepping down the alternate current voltage collected through the power-receiving electrode 8 and also for rectifying this stepped-down alternate-current voltage into a direct current low voltage.

According to this alternate system, the transporter cart A is supplied by the on-the-ground system portion with the alternate current voltage and the direct current low voltage obtained through the battery charger is charged to the battery 12. As a result, while the cart A stays at the predetermined section, the cart A receives the alternate current voltage so that those devices operated on the alternate current source remain operative. For instance, as a power source for operating a transfer equipment, an induction motor, which is highly resistent against load variations, can be used. In this case, since the alternate current source provides the power of a large load, the direct current low voltage obtained through the charger can remain stable without being influenced by load variations. Consequently, the stable current can be supplied to the battery 12.

Incidentally, in the above-described system, preferably, the power-supplying electrode R comprises the power-supplying rail installed at the predetermined section along the cart travelling passage while the power-receiving electrode 8 comprises the collector member 8 for the sliding contact with the power-supplying rail.

With the above arrangement, the transporter cart is supplied from the on-the-ground system portion with the alternate current voltage while this cart is travelling along or stopped at the predetermined section. As a result, even when a plurality of vehicles are present at the same time at the predetermined section where the power-supplying rail is installed, there occurs almost no drop in the alternate current voltage impressed to the power-supplying rail. Accordingly, unlike the conventional system using a constant direct current voltage, the above-described system of the invention can eliminate the necessity of allocating the power-supplying rails to the carts, so that the system of the invention will find an even wider field of application.

This embodiment will be more particularly described next with reference to FIGS. 6 through 10.

Figure 7:
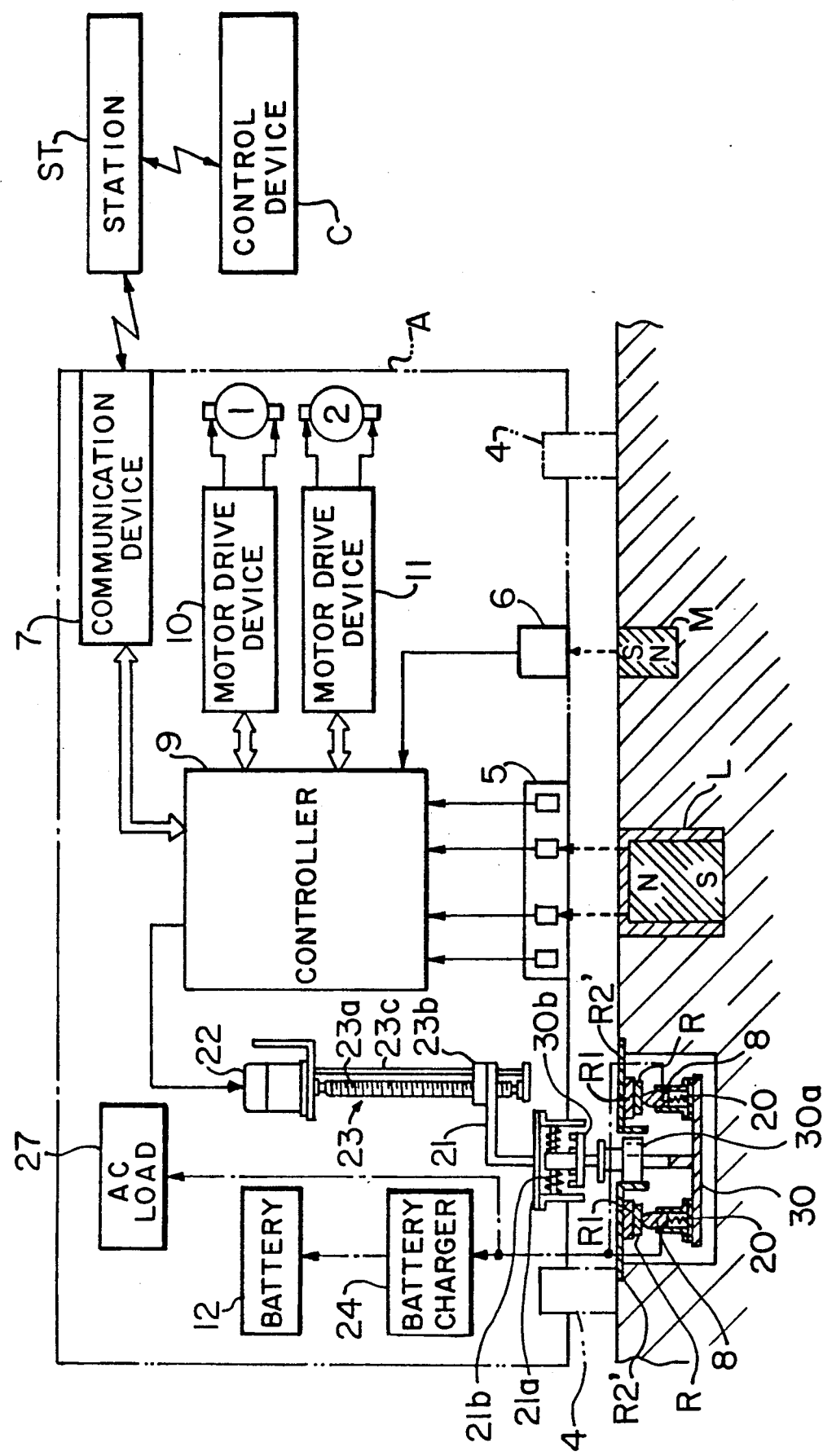
FIG. 7 is a block diagram in section showing major portions of the system as viewed in the direction of transporter cart run.
Figure 8:
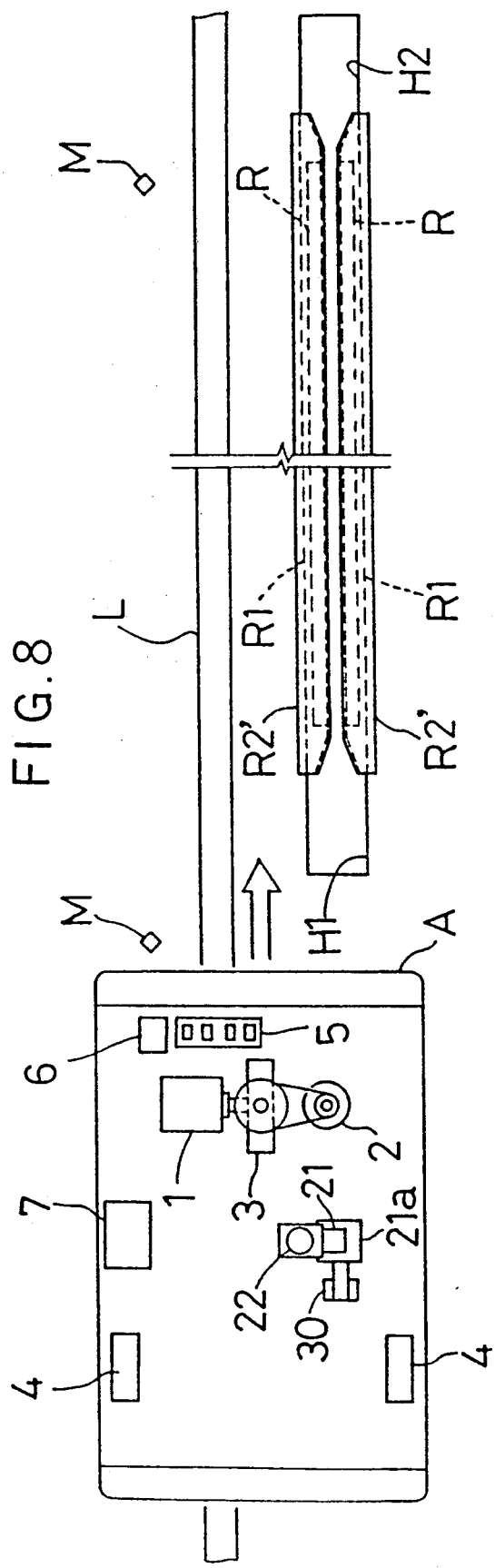
FIG. 8 is a schematic plane view illustrating a relationship between a construction of the transporter cart and a travelling passage.
Figure 9:
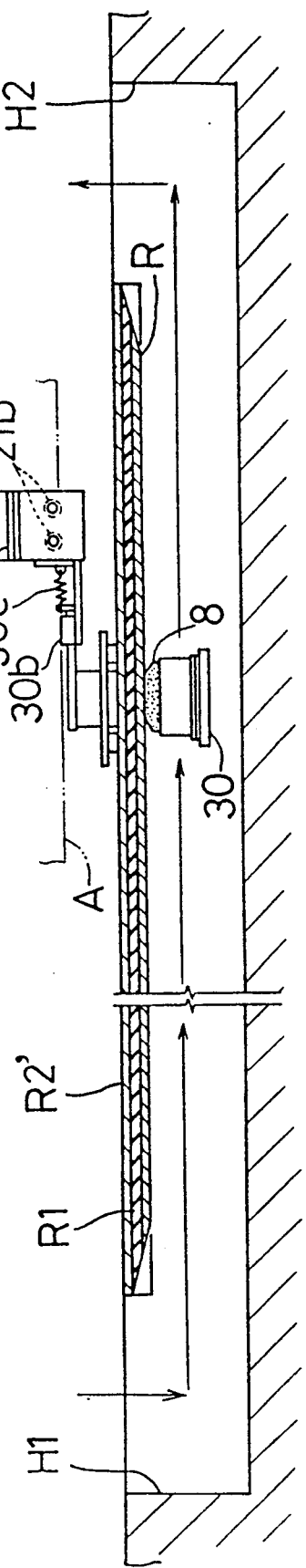
FIG. 9 is a side view in section showing a disposing construction of a power-supplying electrode.
Figure 10:
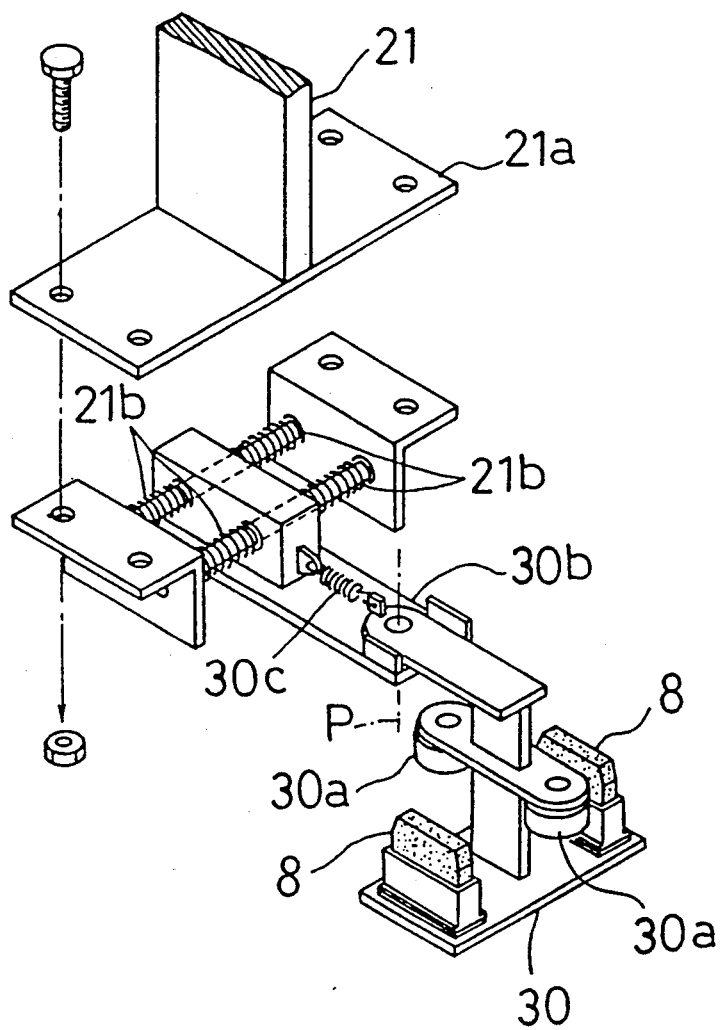
FIG. 10 is a perspective view showing a support construction for supporting a power-receiving electrode.

As shown in FIGS. 7 and 10, a pair of the collector members 8 of the transporter cart A are attached to a support table 30, with the members 8 being elastically urged thereto by means of coil springs 20. The support table 30 is pivotably supported to an relay table 30b through a vertical axis P and is urged by a coil spring 30c to a center of its pivotal range. Further, at vertical centers of the support table 30, there are provided a pair of guide rollers 30a and these rollers 30a are placed into contact with an inner side of a pit cover R2'. That is, this pit cover R2' acts also as a guide for the rollers 30a.

The relay table 30b is attached to a frame table 21a, with the relay table 30b being pivotable within a predetermined range in a direction normal to the travelling direction of the transporter cart A. Four coil springs 21b are used for urging the relay table 30b to a center of the predetermined pivotal range.

The above-described construction allows the collector member 8 to reliably slide-contact with the power-supplying rail R as the power-supplying electrode while effectively absorbing slight lateral and vertical displacements of the cart A relative to the guide line L.

As shown in FIG. 7, the frame 21 is attached to the cart A so that the frame 21 is vertically moved by means of a motor 22 and a screw-feed mechanism 23. And, this screw-feed mechanism 23 includes the male screw 23a fixed to the rotary shaft of the motor 22 and having a peripheral thread, a follower member 23b screw-engaged with the male screw 23a and fixed to the frame 21, and the guide 23c for restricting rotation of the follower member 23b and guiding this member 23b along the longitudinal axis (vertical axis) of the male screw 23a. As the control apparatus 9 drives the motor 22 forwardly or reversely, the frame 21 is moved up or down, whereby the collector members 8 are projected from or retracted to the bottom portion of the transporter cart A.

Figure 6:
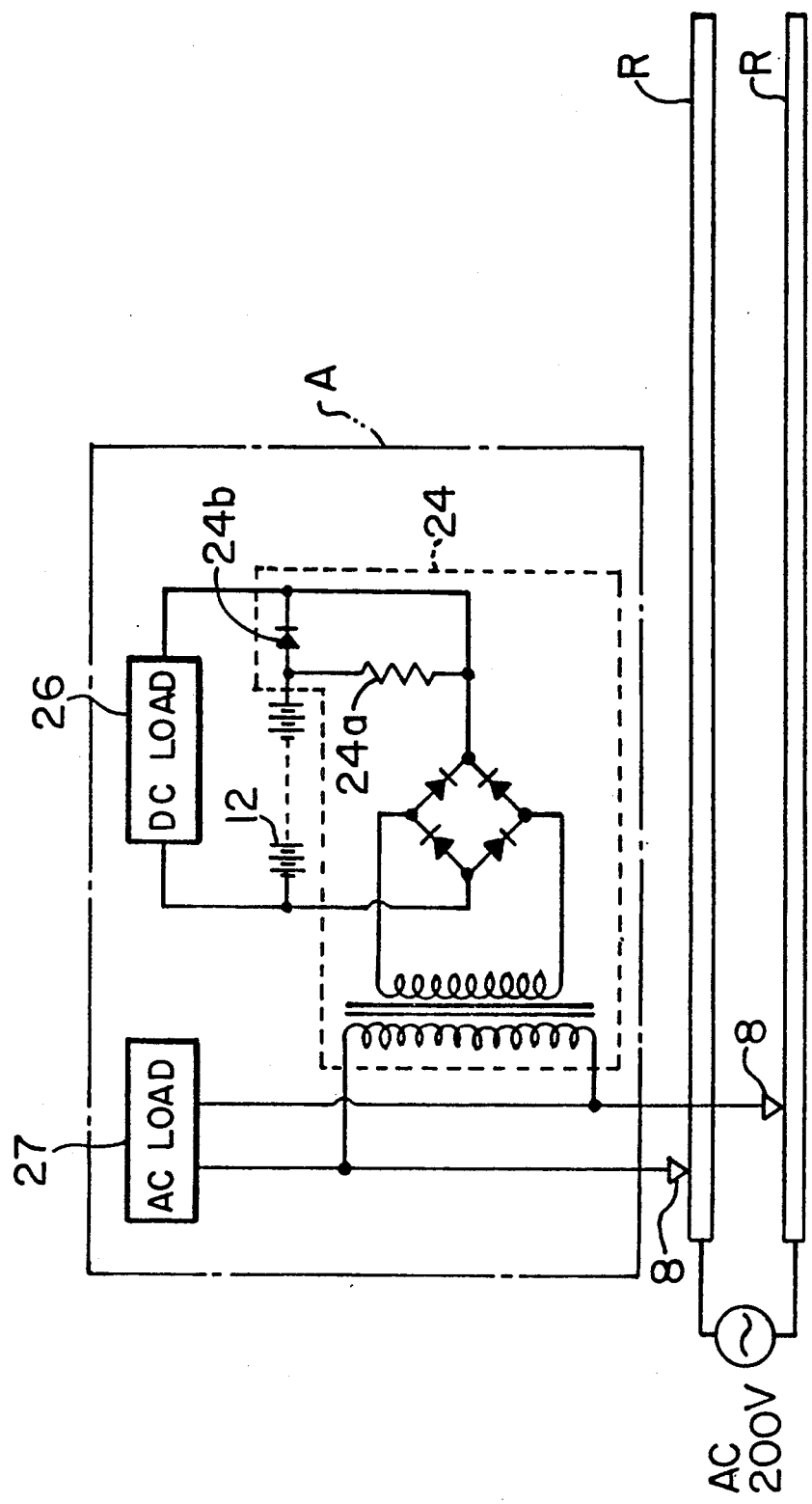
FIG. 6 is a circuit diagram schematically showing electric connection of an entire transporter cart power-charging system according to a further embodiment of the invention.

On the other hand, the power-supplying rail R, as shown in FIG. 6, is impressed with the alternate current voltage (AC 200 V) from the commercial power source supplied from the on-the-ground system portion. Then, at the cart A, this alternate current voltage received through the collector members 8 is stepped down and rectified through the battery charger 24 to obtain the direct current low voltage. This direct current low voltage is impressed to the DC loads 26 including the propelling motor 1, the steering motor 2, the control apparatus 9 and so on and also is impressed to the battery 12 through a current-limiting resistance 24a. A reference mark 24b denotes a diode for supplying current to the DC loads 26 from the battery 12 when the power is not supplied from the on-the-ground system portion.

The direct current low voltage obtained through the battery charger 24 from the supplied alternate current voltage is set slightly higher than the voltage of the battery 12. Accordingly, during the power-charging operation, the diode 24b is reversely biased, so that the entire power for the DC loads 26 is supplied from the battery charger 24 and at the same time a floating power-charging operation is effected on the battery 12.

Since a great amount of power is needed for the job at the station ST such as a load transfer job, an induction motor or the like operating on the supplied alternate current voltage is used as the actuator. That is, the alternate current voltage supplied to the cart A is supplied not only to the battery charger 24, as described hereinbefore, but also directly to the AC loads 27 such as the induction motor.

Accordingly, as the power for the large loads is directly supplied from the alternate current voltage, there occurs only small load variation in the output voltage of the battery charger 24. Consequently, a stable charging current is supplied to the battery 12 on which the floating power-charging operation is effected.

Further, it is possible that a plurality of carts A stay at one predetermined section and receive power from the same power-supplying rail. More particularly, as shown in FIG. 6, if the power-supplying rail R is installed across two stations ST, two carts A stopped respectively at these stations ST receive the power from the one common power-supplying rail R. In this case, since each cart A mounts the battery charger 24, each charger 24 can independently output a stable direct current voltage. In this particular embodiment, the specific construction of the predetermined section is not limited to that disclosed above. For instance, the predetermined section may comprise a single location. That is, in this case, the cart will be electrically connected with the on-the-ground system for power-charge only while the cart A stays at the station ST, so that the charging current can be supplied in the stable manner to the battery 12 without being adversely influenced by load variation during the operation.

Further, the specific construction of the guide line L is not limited that disclosed in connection with the foregoing embodiments. For instance, the guide line L may comprise a magnetic tape affixed to the travelling passage. Or, the line L may comprise a light-reflecting tape. In this case, the cart A mounts a light sensor in place of the magnetism sensor 5.

The present invention may be used also in a transport system having no guide line in which the cart effects a self-contained run. In this case, for ensuring and facilitating the sliding contact between the power-supplying rail R and the collector member 8 of the cart, it is conceivable to install the guide line only at the predetermined section where the power-supplying rail 8 is provided.

The predetermined section of the foregoing embodiments is provided where the transporter cart A travels at a low speed. Then, it is conceivable for the cart to make a further speed reduction or a temporary stop at the starting and terminal ends of the predetermined section so as to facilitate the timing adjustment between the running position of the cart A and the projecting-/retracting operation of the collector member 8.

In the system of the above-described embodiments, the top priorities are placed on the reliability of the conductive surface and the safety, so that the power-supplying rail R is embedded in the travelling passage. Instead, if the priority is placed on simplicity of the installing construction of the power-supplying rail R and the attaching construction of the collector member 8, it is possible to orient the conductive surface of the rail R upwards to be exposed to the ambience.

Further, it is also conceivable to form the conductive rail surface higher than the travelling passage, with the collector member 8 of the transporter cart A being elastically supported at a constant height relative to the travelling surface without projecting from the cart A.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A transporter system comprising a transporter cart having a battery mounted thereon and powering said transporter cart, a travelling passage along which said transporter cart automatically runs, and a power-charging system for said transporter cart, the power-charging system including a power-supplying electrode disposed along and at a predetermined section of said travelling passage, said power-supplying electrode being a power-supplying rail embedded in said travelling passage; and
a power-receiving electrode attached to said transporter cart, coupled to said battery, and slide-contactable with said power-supplying electrode during the automatic run of said cart, said power-receiving electrode being a collector member projectable from and retractable to a bottom portion of said cart, wherein said travelling passage includes a guide line and said cart includes a sensor for sensing said guide line so that said cart automatically travels along said guide line based on the detection of said sensor.

2. A system according to claim 1, wherein said guide line comprises a magnetic member having opposed poles in its front and rear sides, said magnetic member being fixedly covered with epoxy resin so as to form a surface flush with the travelling passage.

3. A system according to claim 2, wherein marks are provided at a starting end and a terminal end of said predetermined section so that said cart detects said starting and terminal ends.

4. A system according to claim 3, wherein each said mark comprises a magnetic member having opposed poles in its front and rear sides.

5. A system according to claim 4, wherein said transporter cart includes, at a forward position thereof, a driving/steering wheel driven for transporter cart drive by a propelling motor drive device through a propelling motor drive device and steered by a steering motor, and includes at rear positions thereof, a pair of right and left driven wheels, and a mark sensor for detecting said mark.

6. A system according to claim 1, wherein said collector member is attached through an elastic member to a frame which in turn is attached to said transporter cart with said collector member being moved up and down by a motor and a screw-feed mechanism.

7. A transporter system comprising a transporter cart having a battery mounted thereon and powering said transporter cart, a travelling passage along which said transporter cart automatically runs, and a power-charging system for said transporter cart, the power-charging system including a power-supplying electrode disposed along and at a predetermined section of said travelling passage, said power-supplying electrode being a power-supplying rail embedded in said travelling passage; and
a power-receiving electrode attached to said transporter cart, coupled to said battery, and slide-contactable with said power-supplying electrode during the automatic run of said cart, said power-receiving electrode being a collector member projectable from and retractable to a bottom portion of said cart, wherein said power-supplying electrode is impressed with an alternate-current voltage, while said cart mounts a battery charger for stepping down the alternate-current voltage collected through said power-receiving electrode and also for rectifying this stepped-down alternate-current voltage into a direct current low voltage.

8. A system according to claim 3, wherein said transporter cart includes, at a forward position thereof, a driving/steering wheel driven for transporter cart drive by a propelling motor through a propelling motor drive device and steered by a steering motor, and includes at rear positions thereof, a pair of right and left driven wheels, and a mark sensor for detecting said mark.

9. A system according to claim 7, wherein said collector member is attached through an elastic member to a support table of a frame which in turn is attached to said cart with said frame being vertically moved by a motor and a screw-feed mechanism.

10. A system according to claim 9, wherein said support table is pivotably supported to a relay table through a vertical axis and is urged to a center of a pivotal range by an elastic member; a pair of guide rollers being provided at vertical centers of said support table.

11. A system according to claim 10, wherein said guide rollers are placed in contact with an inner side of a pit cover covering said power-supply rail.

12. A system according to claim 7, wherein said direct current low voltage obtained through said battery charger is set slightly higher than a voltage of said battery.

* * * * *